3,146,231
KETALS OF 4,6-ANDROSTADIEN-17β-OL-3 ONES
AND ESTERS THEREOF
John W. Dean, Sand Lake, N.Y., assignor to Sterling
Drug Inc., New York, N.Y., a corporation of Delaware
No Drawing. Filed Oct. 26, 1962, Ser. No. 233,459
5 Claims. (Cl. 260—239.55)

This invention relates to new steroid compounds, and in particular is concerned with ketals of 4,6-androstadien-17β-ol-3-ones and esters thereof, and with a process for the preparation of these new compounds.

Despite the statement in the literature that the 3-oxo-4,6-diene moiety is unreactive to ethylene glycol [Bernstein et al., J. Org. Chem. 24, 286 (1959)], it has been found that ethylene glycol can be caused to react with 4,6-androstadien-17β-ol-3-one to produce the 3-ketal, 3,3-ethylenedioxy-4,6-androstadien-17β-ol.

The compounds of the invention are of the following general formula:

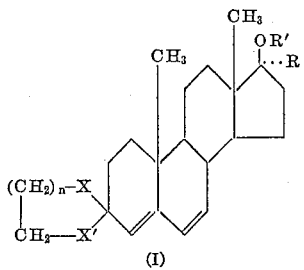

(I)

wherein R is hydrogen or lower-alkyl, R' is hydrogen or lower-alkanoyl, X and X' are oxygen or sulfur, and n is a positive integer less than 3.

When R in the above Formula I stands for lower-alkyl, the groups can have from one to four carbon atoms, thus including methyl, ethyl, propyl, isopropyl, butyl and the like.

When R' in the above Formula I stands for lower-alkanoyl, the groups can have from one to six carbon atoms, thus including formyl, acetyl, propionyl, butyryl, isobutyryl, valeryl, caproyl and the like.

The compounds of the invention are prepared by heating together in the presence of a strong acid a glycol or thioglycol of the formula HX—(CH$_2$)$_n$CH$_2$—X'H with a 3-oxo steroid of the formula

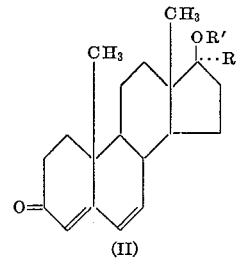

(II)

R, R', X and X' and n having the meanings given hereinabove. The process is preferably carried out at the reflux temperature of the reaction mixture with means of removing the water produced in the reaction. An organic solvent can be used but is not essential. The nature of the strong acid is not critical provided it does not cause deleterious side reactions. Preferred acids include hydrogen chloride and organic sulfonic acids, e.g., p-toluenesulfonic acid.

The compounds of Formula I where R' is lower-alkanoyl can be prepared from the compounds where R' is hydrogen by conventional esterification reactions, as by interaction with the appropriate acid halide or acid anhydride.

Endocrinological evaluation of the compounds of the invention has shown that they possess useful hormonal properties. In particular they exhibit androgenic and pituitary inhibiting activities.

The compounds of the invention can be prepared for use by dispersing them in an aqueous suspension or by dissolving them in a pharmacologically acceptable oil or oil-water emulsion for parenteral administration.

The structures of the compounds of the invention were established by the mode of synthesis, by ultraviolet and infrared spectral analysis, and by the fact that the values found upon elementary analysis corresponded to the values calculated for the assigned structures. The ultraviolet spectrum, which displayed characteristic absorption for 4,6-dien-3-alkoxy compounds at 234, 239 and 248 mμ, showed that the double bonds had not shifted away from the 4,6-positions during ketalization.

The following examples will further illustrate the invention without the latter being limited thereby.

EXAMPLE 1

3,3-Ethylenedioxy-4,6-Androstadien-17β-Ol

A mixture of 23.0 g. of 4,6-androstadien-17β-ol-3-one (M.P. 203–205° C.), 1.16 g. of p-toluenesulfonic acid monohydrate, 116 ml. of ethylene glycol and 1900 ml. of benzene was refluxed for 24 hours under a water separator. The reaction mixture was then cooled to room temperature and shaken with 500 ml. of saturated sodium bicarbonate solution. The benzene layer was separated, washed with three 500 ml. portions of water and dried over anhydrous sodium sulfate. The benzene solution was filtered and concentrated to dryness in vacuo, and the residue was chromatographed on Florisil (activated magnesium silicate). The column was eluted with 20% ether in n-pentane and the product recrystallized first from ether containing a drop of pyridine and then several times from a mixture of ether and hexane containing a trace of pyridine. There was thus obtained 3,3-ethylenedioxy-4,6-androstadien-17β-ol, M.P. 181.2–183.6° C. (corr.), [α]$_D^{25}$ +88.9° (1% in chloroform). The infrared spectrum was consistent with the assigned structure, and ultraviolet absorption was observed at λ$_{max}$ 239 mμ (ε 25,200), λ$_{max}$ 234 mμ (shoulder) (ε 23,800) and λ$_{max}$ 248 mμ (shoulder) (ε 15,700).

By replacing the 4,6-androstadien-17β-ol-3-one in the foregoing example by a molar equivalent amount of 17α-methyl-4,6-androstadien-17β-ol-3-one or 17β-propionoxy-4,6-androstadien-3-one, there can be prepared, respectively, 3,3 - ethylenedioxy - 17α - methyl - 4,6 - androstadien-17β-ol or 3,3-ethylenedioxy-17β-propionoxy-4,6-androstadiene.

By replacing the ethylene glycol in the foregoing example by a molar equivalent amount of 1,3-propylene glycol, ethane-1,2-dithiol, propane-1,3-dithiol or 2-mercaptoethanol, there can be obtained, respectively, 3,3-(1,3-propylenedioxy) - 4,6 - androstadien - 17β - ol, 3,3 - ethylenedithio - 4,6 - androstadien - 17β - ol, 3,3 - (1,3- propylenedithio)-4,6-androstadien-17β-ol, or the ethylene hemithio ketal of 4,6-androstadien-17β-ol-3-one.

EXAMPLE 2

17β-Acetoxy-3,3-Ethylenedioxy-4,6-Androstadiene

A mixture of 7.00 g. of 3,3-ethylenedioxy-4,6-androstadien-17β-ol, 10 ml. of pyridine and 5 ml. of acetic anhydride was heated at 100° C. for thirty minutes and then cooled in ice. The product which separated was collected by filtration, washed with cold ether and n-hexane and recrystallized from n-hexane to give 17β-acetoxy-3,3-ethylenedioxy-4,6-androstadiene, M.P. 160.2–161.4° C. (corr.), $[\alpha]_D^{25}$ +61.1° (1% chloroform). With the exception of acetate absorption bands present in the infrared spectrum, the ultraviolet and infrared spectra were identical with those of the 17β-hydroxy compound.

By replacing the acetic anhydride in the foregoing example by a molar equivalent amount of propionic anhydride, butyric anhydride or caproyl chloride, there can be obtained, respectively, 17β-propionoxy-3,3-ethylenedioxy-4,6-androstadiene, 17β-butyryloxy-3,3-ethylenedioxy-4,6-androstadiene, or 17β-caproyloxy-3,3-ethylenedioxy-4,6-androstadiene.

I claim:
1. A compound of the formula

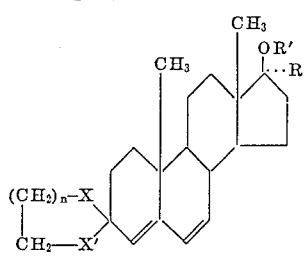

wherein R is selected from the group consisting of hydrogen and lower-alkyl, R' is selected from the group consisting of hydrogen and lower alkanoyl, X and X' are selected from the group consisting of oxygen and sulfur, and n is a positive integer less than 3.

2. 3,3-ethylenedioxy-4,6-androstadien-17β-ol.
3. 17β-acetoxy-3,3-ethylenedioxy-4,6-androstadiene.

4. The process for preparing a compound of the formula

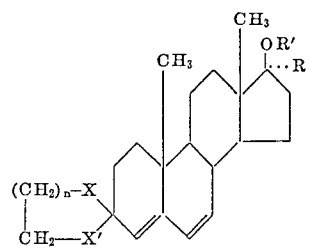

which comprises heating a compound of the formula

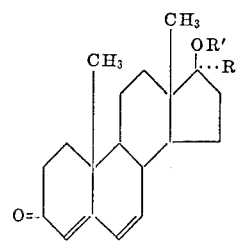

with a compound of the formula

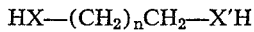

in the presence of a strong acid, wherein R is selected from the group consisting of hydrogen and lower-alkyl, R' is selected from the group consisting of hydrogen and lower-alkanoyl, X and X' are selected from the group consisting of oxygen and sulfur, and n is an integer from 1 to 2.

5. The process for preparing 3,3-ethylenedioxy-4,6-androstadien-17β-ol which comprises heating 4,6-androstadien-17β-ol-3-one with ethylene glycol in the presence of a strong acid.

References Cited in the file of this patent

Fonken: Journal of Organic Chemistry, vol. 26 (1961), page 2549 relied on.

Brown et al.: "Experimentia," No. 7, July 15, 1962, pages 309–10 relied on.